Patented Nov. 28, 1944

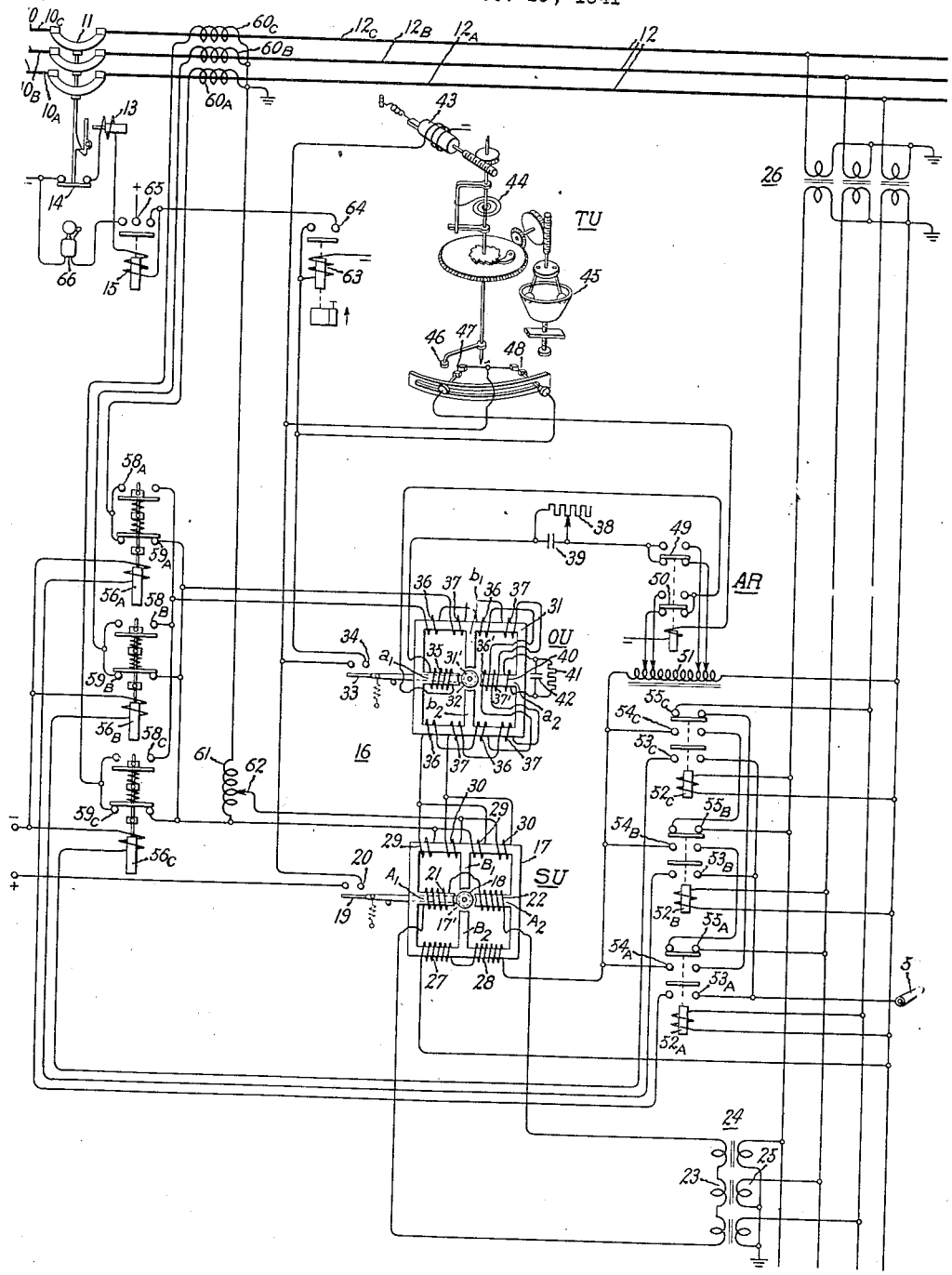

2,363,915

UNITED STATES PATENT OFFICE 2,363,915

PROTECTIVE SYSTEM

Albert R. van C. Warrington, Wallingford, Pa., assignor to General Electric Company, a corporation of New York Application December 19, 1941, Serial No. 423,661

13 Claims. (Cl. 175—294)

My invention relates to protective systems for electric circuits and more particularly to protective systems employing relays of the distance type for protecting against ground faults. Specifically, my invention is an improvement on United States Letters Patent 1,573,622 and 2,008,544 assigned to the same assignee as the present application.

Owing to the possibility of high resistance in the ground fault circuit, distance relays of the reactance type are preferable to those of the impedance type for protecting against ground faults. The resistance in the faulted circuit may be in the arc, the tower footing, or the path through the ground. Also the power transformer is often grounded through a resistor. Although my invention is applicable to ground-fault distance relays of either the impedance or the reactance type, because of the more desirable operation my invention has been illustrated and is more specifically concerned with ground-fault relays of the reactance type.

In some of the arrangements of the prior art, it has been suggested to use a single distance relay to protect against ground faults on a polyphase system and to provide switching means for connecting the windings of the distance relay so as to be energized with electrical quantities derived from the faulted conductor. In all such prior arrangements using a single distance relay to protect against all ground faults, however, certain difficulties were encountered both in so far as obtaining the same distance response under all ground-fault conditions and with respect to preventing false tripping during the switching operations or when the fault changes from one type to another.

Accordingly, it is an object of my invention to provide a new and improved distance relay.

It is another object of my invention to provide a new and improved ground-fault distance relay protective system in which a single distance relay is connected so as to be energized with electrical quantities derived from the faulted conductor so as to give the same distance response regardless of which conductor is involved in the fault.

Still another object of my invention is to provide a new and improved ground-fault distance relay in which false tripping is substantially eliminated.

A still further object of my invention is to provide a ground-fault distance relay for protecting against single line-to-ground faults which has the restraint thereof increased to cause underreaching and, consequently, to provide backup protection when more than one conductor is involved in the ground fault.

Further objects and advantages of my invention will become apparent as the following description proceeds and the features of novelty which characterize my invention will be pointed out with particularity in the claims annexed to and forming a part of this specification.

Distance relays of the reactance type usually include a a distance-measuring unit or ohm unit having a movable element upon which two opposed torques are impressed, one an operating torque proportional respectively to the square of the fault current and the other a restraining torque proportional to the reactive volt amperes of the circuit at the relay which may be mathematically designated as $I^2$ and $EI \sin \phi$, respectively, where $\phi$ is the angle between current and voltage vectors $I$ and $E$, respectively, measured at the relay. When these two torques are equal, the ratio $$\frac{EI \sin \phi}{I^2} = X_1$$

where $X_1$ is the positive-phase-sequence reactance of the circuit for the maximum distance to which the relay will reach. Any faults occurring beyond this distance will not cause relay operation while, for faults closer to the relay, the relay will operate.

It is desirable, therefore, to energize the current and the potential windings of a distance relay in such a manner that the relay will measure positive-phase-sequence reactance or impedance, depending upon whether the relay is of the reactance or impedance type. If the potential winding of the ohm unit of the distance relay is energized with a potential which is zero at the fault or would be zero except for the arc drop at the fault, then it is a simple matter to calculate the potential drops from the fault to the relay in order to determine what current energization is required without requiring a consideration of numerous other quantities of the system such as the source voltage and the like. In the case of ground faults, both single and double line-to-ground faults, the line-to-neutral voltages of the faulty conductor are zero at the fault, assuming no fault resistance. Assuming the existence of a fault resistance in the case of a ground fault, the line-to-neutral voltage at the ohm unit a predetermined distance from the fault may be expressed by the following equation:

$$E_A = I_1(Z_1 + R_f) + I_2(Z_2 + R_f) + I_0(Z_0 + R_f) \quad (1)$$

where $E_A$ is the line-to-neutral voltage of the phase conductor A; $I_1$, $I_2$, and $I_0$ are the positive, negative, and zero-phase-sequence currents flowing in the phase conductor A; $Z_1$, $Z_2$, and $Z_0$ are the corresponding positive, negative, and zero-phase-sequence impedances to these currents; and $R_f$ is the fault resistance. Equation 1 may be considerably simplified by substituting $Z_1$ for $Z_2$ since, for any balanced static circuit such as a transmission line, $Z_1$ is substantially equal to $Z_2$ and further by adding to and subtracting from the right-hand expression of Equation 1 the term $I_0(Z_1+R_f)$. Then it becomes $$E_A = (I_1+I_2+I_0)(Z_1+R_f) + I_0(Z_0-Z_1) \quad (2)$$

In terms of phase-sequence components, the line current $I_A$ flowing in phase conductor A may be expressed as follows:

$$I_A = I_1 + I_2 + I_0 \quad (3)$$

Substituting for $I_1+I_2+I_0$ in Equation 2 from Equation 3, Equation 2 may be simplified as follows:

$$E_A = I_A(Z_1+R_f) + I_0(Z_0-Z_1) \quad (4)$$

If $I_A$ is chosen as the reference vector, then Equation 4 may be expressed as follows in complex number notation, $I_0$ having the same phase position as $I_A$:

$$E_A(\cos\phi + j\sin\phi) = I_A(R_1+jX_1+R_f) + I_0[(R_0-R_1)+j(X_0-X_1)] \quad (5)$$

where $R_1$ and $R_0$ are the positive and zero-phase-sequence resistances, $X_1$ and $X_0$ are the positive and zero-phase-sequence reactances, and $j$ is a mathematical operator. Equating the imaginary quantities of Equation 5, which are the only ones of interest in connection with a reactance relay, the following equation results:

$$E_A \sin\phi = I_A X_1 + I_0(X_0-X_1) \quad (6)$$

If both sides of Equation 6 are divided by the following term:

$$I_A + I_0\left(\frac{X_0-X_1}{X_1}\right)$$

it reduces to $$\frac{E_A \sin\phi}{I_A + I_0\left(\frac{X_0-X_1}{X_1}\right)} = X_1 \quad (7)$$

In Equation 7, the expression $$\left(\frac{X_0-X_1}{X_1}\right)I_0$$

may be represented by $KI_{residual}$, where $K$ is a constant and $I_{residual}$ is the sum of the zero-phase-sequence components of the current in the phase conductors. The constant $K$ is a function of the system setup. With the substitution of this term, Equation 7 may be written as follows:

$$\frac{E_A \sin\phi}{I_A + KI_{residual}} = X_1 \quad (8)$$

For an impedance relay instead of a reactance relay, Equation 8 would be expressed as follows:

$$\frac{E_A}{I_A + KI_{residual}} = Z_1 \quad (9)$$

From Equation 9, it will be observed that correct operation of a ground-fault distance relay of the impedance type for all types of ground faults will be obtained if the potential windings of the ohm unit of the distance relay are energized with the line-to-neutral voltage of the faulted phase conductor and the current windings are energized so as to produce a flux proportional to the corresponding line current plus a predetermined amount of residual current. In the case of a distance relay of the reactance type energized in accordance with the expression of Equation 8, although correct operation for single line-to-ground faults is assured, I have found that correct operation for double line-to-ground faults is not always the case because of the sine function involved in Equation 8. The extra current flowing between the phases may reduce the angle $\phi$ so that the reactance measured is falsely small and, as will be described in greater detail hereinafter, means are provided in accordance with my invention for preventing any false operation under such double line-to-ground faults.

For a better understanding of my invention, reference may be had to the accompanying drawing in which the single figure thereof schematically illustrates a ground-fault protective system embodying my invention.

Referring now to the drawing, I have illustrated my invention as applied to a polyphase alternating-current system comprising a three-phase bus 10, including the respective phase conductors 10A, 10B, and 10C connected through a suitable circuit-interrupting means, such as latched closed circuit breaker 11, to a polyphase transmission line or circuit to be protected 12 including the corresponding phase conductors 12A, 12B, and 12C, respectively. The circuit breaker 11 is shown as provided with a trip coil 13 and an "a" auxiliary switch 14 which is closed when the circuit breaker is closed and open when the circuit breaker is open. The circuit of the trip coil 13 may include a seal-in relay 15 to by-pass the more delicate protective relay contacts and to insure a definitely maintained energization of the trip coil 13 once the protective relay contacts have operated to initiate its energization.

In order to isolate the polyphase circuit or transmission line 11 from the associated system, such as bus 10, upon the occurrence of a ground fault thereon, I have provided a ground-fault protective scheme which includes an electroresponsive device generally indicated at 16 comprising a distance relay of the reactance type. This polyphase distance relay comprises a starting unit SU, an ohm unit OU, an auxiliary relay AR, and a timing unit TU.

The structure of the starting unit SU may be of the type disclosed in United States Reissue Patent 21,813, granted May 27, 1941, upon an application of V. E. Verrall, and assigned to the same assignee as the present application, and, as shown schematically in the drawing, comprises a hollow magnetic stator 17 having two angularly displaced pairs of inwardly projecting salients $A_1$, $A_2$, $B_1$, $B_2$. Centrally positioned relatively to and spaced from the ends of these salients is a magnetic member or stator 17', as described in said Verrall reissue patent and shown dotted in the drawing since it is covered by a rotor 18 of electric current-conducting material which is preferably in the form of a generally cylindrical cup and is mounted to rotate in the gaps between the central stator 17' and the ends of the salients $A_1$, $A_2$, $B_1$, $B_2$. A contact-controlling member 19 movable with the rotor 18 is arranged to control the contacts 20 which cooperate in the control of the energization of the trip coil 13 and also in the control of the timing unit TU and the associated auxiliary relay AR as will be described in greater detail hereinafter.

In order to secure the desired directional action or response to the direction of fault-power flow, the starting unit SU is constructed with an operating characteristic of the form $$K_1 E_1 I f(\theta) - K_2 E_1 E_2 f(\beta)$$

or, in other words, a power-directional torque opposed by a voltage-restraint torque, $K_1$ and $K_2$ being constants, $E_1$ and $E_2$ voltages of the circuit, I a current of the circuit, $f(\theta)$ a function of the phase angle between $E_1$ and I, and $f(\beta)$ a function of the phase angle between $E_1$ and $E_2$. Thus, referring to the starting unit SU, the salients $A_1$ and $A_2$ are provided with polarizing windings 21 and 22, respectively, connected in series with each other and arranged to be energized by the zero-phase-sequence potential of transmission line 12 as obtained from the open delta secondary winding 23 of a transformer 24 having a Y-connected primary winding 25 energized from potential transformer 26 associated with the electric circuit comprising transmission line 12. The windings 21 and 22 are so arranged as to provide a flux in the same direction across the gap between the salients $A_1$ and $A_2$. On the stator 17 on opposite sides of the salient $B_2$, there are voltage-restraining windings 27 and 28, respectively, connected in series and arranged to be energized by the faulted line-to-neutral voltage of polyphase circuit 12 so that both the windings 27 and 28 produce flux in the same direction in the salient $B_2$. The flux of the restraining windings 27 and 28 thus cooperates with the flux of the polarizing windings 21 and 22 to provide a restraining torque on the rotor 18 which is proportional to the product of the voltages energizing the windings and the function of the phase angle between these voltages or, in other words, proportional to $K_2 E_1 E_2 f(\beta)$.

In order to obtain the desired power-directional torque, the stator 17 of the starting unit SU is provided with two current windings 29 and two current windings 30 to produce a flux in the salient $B_1$ which cooperates with the flux in the salients $A_1$ and $A_2$ to produce an operating torque on rotor 18. The windings 29 are adapted to be energized by the current flowing in the faulted line, as will be described in greater detail hereinafter, while the windings 30 are adapted to be energized by a predetermined proportion of the residual current flowing in the protected section 12, as will also be described in greater detail hereinafter.

Inasmuch as it is necessary to obtain reliable directional action even on faults close to the bus 10 causing heavy currents at low voltage, it is necessary to eliminate any torque due to current alone in consequence of any dissymmetry in the distribution of flux in the current salient $B_1$. The effect of any such dissymmetry in the flux may be considered as a cross flux flowing between the salients $A_1$ and $A_2$ which are at right angles to the salient $B_1$. This cross flux would react with the flux in the salient $B_1$ to produce an unwanted torque. In order to eliminate this undesirable torque, the two current windings 29 are placed on opposite sides of the salient $B_1$ and each has substantially the same number of turns so that, when energized by the same alternating-current winding, each develops substantially the same magnetomotive force to produce substantially the same flux between the salient $B_1$ and each of the salients $A_1$ and $A_2$. Similarly, windings 30 are placed one on either side of the salient $B_1$ and each has the same number of turns. Further, in order to achieve the elimination of torque due to current alone, the windings 29 are connected in parallel with each other so that they have the same voltage across them and, since their respective currents and voltages are the same, the fluxes produced by them are the same. The fluxes produced by windings 30 are also the same for the same reason. Consequently, there will be no dissymmetry in the distribution of flux from the current salient $B_1$ or no apparent cross flux effects between the salients $A_1$ and $A_2$. This arrangement of windings is disclosed and claimed in my prior Patent 2,214,867, granted September 17, 1940, and assigned to the same assignee as the present application.

The structure of the ohm unit OU may also be of the type disclosed in the above-mentioned Verrall reissue patent and, as shown, comprises a hollow magnetic stator 31 having two angularly displaced pairs of inwardly projecting salients $a_1$, $a_2$, $b_1$, $b_2$. Centrally positioned relatively to and spaced from the ends of the salients is a magnetic member or stator 31', shown dotted since it is covered by a rotor 32 of electric current-conducting material which, in the form of a generally cylindrical cup, is mounted to rotate in the gaps between the central stator 31' and the ends of the salients $a_1$, $a_2$, $b_1$, $b_2$. A contact-controlling member 33 movable with the rotor 32 is arranged to control contacts 34 which cooperate in the control of the energization of trip coil 13 as will be described hereinafter.

In order to secure the desired ohmic response or distance measuring action, the ohm unit OU has an operating characteristic of the form $$K_3 I^2 - K_4 E_2 I f(\theta)$$

where $K_3$ and $K_4$ are constants; I and $E_2$, respectively, a current and a voltage derived from the circuit; and $f(\theta)$ a function of the phase angle between them, which will be a sine function where the distance response is based on the reactance of the circuit. For the reactance type ohm unit illustrated for protecting against single line-to-ground faults, the operating characteristic based on Equation 8 above will actually be:

$$K_3 (I_A + K I_{residual})^2 - K_4 (I_A + K I_{residual}) E_A \sin \theta$$

where the A phase conductor is the faulted conductor.

Accordingly, the salient $a_1$ of the ohm unit OU is provided with a potential winding 35 connected to be energized in accordance with the line-to-neutral voltage of the faulted phase and which is obtained from the potential transformer 26 connected to be energized with the potential of the protected section 12. A plurality of current windings 36 and 37 are provided for the stator 31 of ohm unit OU. The windings 36 are connected in series with one another and are arranged so that one of these windings is provided on stator 31 on each side of the salients $b_1$ and $b_2$. Similarly, the windings 37 are connected in series with each other and are also arranged on stator 31 so that one winding is provided on each side of the salients $b_1$ and $b_2$. In order that a flux is produced in the salients $b_1$ and $b_2$ proportional to the faulted line current plus a predetermined amount of residual current, as was mentioned above, the windings 36 are connected to be energized with the current flowing in the faulted line while the windings 37 are energized with a predetermined amount of the residual current flowing in the protected section 12 in the same manner as the windings 29 and 30 of starting unit SU. The distribution of the windings 36 and 37 mentioned above is provided in order to minimize cross flux in the salients $a_1$ and $a_2$ which would add to the operating torque, as was described in detail in connection with the starting unit SU. With the arrangement described above, potential winding 35 and current windings 36 and 37 produce interacting fluxes which provide a restraining torque on the rotor 31 proportional to $$K_4(I_A + KI_{residual})E_A \sin \phi$$

as mentioned above if the A phase conductor is the faulted conductor.

Further, in order to have the desired sine function of $\phi$ as well as to satisfy other conditions, I connect in series with the potential winding 37 a resistance 38 and a parallel connected capacitor 39. These are so proportioned with respect to the inductance of the potential circuit that this circuit is resonant at unity power factor in order to enable the unit to respond only to the reactive component of the ohmic measurement and further to make the potential circuit dead beat so as to prevent incorrect operation in the event of sudden changes of line voltage when a fault occurs and also to make the current in the potential circuit at a given voltage of such a value as to cause the unit to operate at a desired ohmic value. These three conditions can readily be fulfilled because there are three variables involved in three independent equations as disclosed in my prior Patent 2,131,608, granted September 27, 1938, and assigned to the same assignee as the present application.

In order to obtain the desired operating torque on the rotor 32 of ohm unit OU, which is proportional to $(I_A + KI_{residual})^2$ when the faulted conductor is the A phase conductor, salient $a_2$ is provided with the windings 36' and 37', respectively. The winding 36' is connected in series with the windings 36 and the winding 37' is connected in series with the windings 37 to provide a current flux which cooperates with the current flux between the salients $b_1$ and $b_2$. Since these two fluxes are in phase and, consequently, when in the same phase arrangement will produce no torque, I provide a phase-shifting winding 40 on the salient $a^2$ and connect in parallel therewith the resistor 41 and capacitor 42. Here, again, relative to the inductance of the circuit of the winding 40 of salient $a_2$, the resistance 41 and the capacitor 42 are so proportioned that the flux in the salient $a_2$ is shifted a suitable amount to obtain adequate torque from the interaction of the flux of salient $a_2$ with the current flux between the salients $b_1$ and $b_2$ and, further, so that the ohmic response may not vary over a large range of current due to local saturation and also so that this circuit may be critically damped to prevent incorrect operation due to sudden changes in current or voltage consequent upon system transients.

In order to obtain a compact arrangement of the electroresponsive device 16, the ohm unit OU and the starting unit SU are arranged generally with their stators 17 and 31 in parallel planes, one above the other, although, in the drawing for the purpose of better illustrating the invention, they are schematically shown with the stators revolved into the same plane.

In consequence of the nearness of their magnetic fields, it is necessary to insure that the relative positions of the stators 17 and 31 do not introduce further extraneous torques due to fluxes fringing or leaking from the poles of some salients on one stator in such a manner as to induce potentials on the windings of another stator. Thus, for example, I so arrange the starting unit SU that the potential salients $A_1$, $A_2$ are angularly displaced with respect to the current salients $b_1$, $b_2$ of the ohm unit OU so that the leakage flux from the current salients will not induce a potential in the polarizing windings 21 and 22 of starting unit SU and thereby tend to cause erroneous action on low voltage with high currents. As a matter of practical construction and arrangement of parts, the salients $b_1$ and $b_2$ of the ohm unit OU are at right angles to the salients $A_1$ and $A_2$ of the starting unit SU.

For more satisfactory operation, I have provided a stepped time distance characteristic for electroresponsive device 16 such that the circuit breaker 11 may be tripped substantially instantaneously for all faults within a given percentage, such as 90 per cent, of the section of the power line 12 extending from the bus 10 toward the next adjacent section and a time-delay tripping for faults beyond this point and over a predetermined range of distance into the next section and a still greater time limit for tripping to take care of conditions which may arise due to failure of some particular relay by means of a timing unit TU and means such as the auxiliary relay AR for automatically varying the reactance setting of the ohm unit OU. As shown, the timing unit TU includes an electromagnetic motor unit 43 which, when energized, stores energy in a spring 44. This energy is released through a mechanism, generally indicated at 45 to actuate a movable contact 46 to engage different sets of adjustably positioned contacts 47 and 48 after a time delay dependent upon the positioning of these contacts and the initial position of the movable contact 46. The auxiliary relay AR through its movable contacts 49 and 50 changes the ohmic setting of the ohm unit OU by varying the tapped connections of the autotransformer 51 and thus varying the potential on the potential winding 35 of ohm unit OU so that, with only one ohm unit, at least two reactance settings may be provided.

I have arranged the starting and timing units SU and TU, respectively, and the auxiliary relay AR to control the ohmic setting of the ohm unit OU so as momentarily to decrease the ohmic setting of the ohm unit a predetermined time after the response of the starting unit, thereby minimizing the possibility of incorrect tripping in consequence of an artificial reduction in the circuit reactance due to an oscillatory condition on the power circuit. For this purpose, the contacts 20 of the starting unit SU are connected in series with the energizing circuit of motor element 43 of timing unit TU as well as in series with the winding of the auxiliary relay AR through the contacts 46 and 47 of the timing unit TU.

The auxiliary relay AR is provided with the necessary circuit-restoring means, such as gravity, which returns the contacts 49 and 50 to their initial position and the ohm unit OU to its initial ohmic setting when the winding of the auxiliary relay AR is deenergized. Since the timing unit contacts 46 and 47 are closed only momentarily, it may be desirable to provide a short time delay for the auxiliary relay AR which can be obtained by any suitable means well known to those skilled in the art. With this arrangement, each ohmic setting is assured only for a period during which the moving contact 46 of the timing unit TU is touching the corresponding stationary contact. When it leaves the stationary contact, the ohm unit OU is returned to its original setting which reduces its zone of operation. In this way, the back-up zones or zones of protection will be available only for short periods (long enough for tripping) and, during the majority of the time, the setting will be on the first or short zone, thereby making the relay less liable to trip on power swings.

The usual arrangement of distance relays is to have the ohm unit continue on a given ohmic setting until changed to the next one and staying on that one until the next change. As will be apparent to those skilled in the art, such a stepped time-distance characteristic can also be obtained with my arrangement by providing contacts on the auxiliary relay AR for each step to seal it in so that it may stay in the operative position after the timing unit contact 46 has passed by the contact corresponding to a given ohmic setting, although the arrangement illustrated in the drawing is believed to be preferable.

Since only a single electroresponsive device 16 has been provided to protect against ground faults on polyphase circuit 12, it is necessary to provide means for insuring energization of the current and potential windings thereof with electrical quantities derived from the faulted conductor. To this end, I have provided a plurality of selector relays 52A, 52B, and 52c connected to be energized with the respective line-to-neutral voltages of the corresponding phase conductors 12A, 12B, and 12c, respectively, through potential transformer 26. Selector relays 52A, 52B, and 52c have been illustrated as undervoltage relays which are normally picked up in the manner indicated in the drawing when transmission line 12 is energized and no fault occurs thereon but it should be understood that any other form of selector relays, such as overcurrent relays or the like, might be used. Selector relays 52A, 52B, and 52c in the normal position indicated control a plurality of normally open contacts 53 and 54, respectively, and a set of normally closed contacts 55. These contacts are designated with the appropriate subscript A, B, and C in the drawing in order to relate them to the corresponding relay 52A, 52B, or 52c with which they are associated. The normally closed contacts 55 and the normally open contacts 54 of selector relays 52A, 52B, and 52c control the energization of voltage-restraining windings 27 and 28 of starting unit SU as well as the energization of autotransformer 51 which supplies the power for energizing potential winding 35 of ohm unit OU. All of these windings 27, 28, and 35 are energized with the line-to-neutral voltage of the faulted phase conductor. If the line-to-ground fault is on phase conductor 12A, phase selector relay 52A will be deenergized to close its contacts 53A and open its contacts 55A, whereupon windings 27 and 28 and autotransformer 51 are energized with the voltage EA through contacts 55c of selector relay 52c and contacts 54A of selector relay 52A. Similarly, if the phase conductor 12B is faulty, phase selector relay 52B will be deenergized and the potential windings of electroresponsive device 16 will be energized with a potential EB through a circuit which includes contacts 54B of selector relay 52B and contacts 55A of selector relay 52A. Also, if a ground fault occurs on phase conductor 12c, the potential windings of the electroresponsive device 16 will be energized with a potential Ec since phase selector 52c is deenergized and a circuit is completed through contacts 54c of phase selector 52c and contacts 55B of phase selector 55A. The reason for the series selection of contacts 54 and 55 of the phase selector relays 52A, 52B, and 52c will be explained in greater detail hereinafter.

In order that the current windings of electroresponsive device 16 may be energized so as to produce a flux proportional to the line current of the particular conductor having a ground fault thereon plus a predetermined amount of residual current, the contacts 53A, 53B, and 53c of the respective selector relays 52A, 52B, and 52c when closed complete the energization circuit for corresponding current transfer relays 56A, 56B, and 56c, respectively, when manually operated control switch 57 is closed. Any source of potential may be provided for energizing the circuit of the respective current transfer relays 56 and I have preferred to illustrate this as a direct-current source. The current transfer relays 56A, 56B, and 56c are schematically illustrated as the make-before-break type of relay, each having one normally open set of contacts 58 and a normally closed set of contacts 59. These contacts are designated by the appropriate subscripts A, B, and C to relate them to the corresponding current transfer relay with which they are associated. The current for energizing the current windings of electroresponsive device 16 is obtained from a plurality of Y-connected current transformers 60A, 60B, and 60c associated with the respective phase conductors 12A, 12B, and 12c of transmission line 12. The phase terminals of the secondary windings of current transformers 60A, 60B, and 60c are each connected to the corresponding contacts 58 and 59 of the current transfer relays 56A, 56B, and 56c, respectively. The residual current obtained from current transformers 60A, 60B, and 60c is carried through a circuit which is completed through an autotransformer 61 which has one terminal thereof connected to the neutral of the Y-connected current transformer 60 while the other terminal is connected to the contacts 59 of selector relays 56A, 56B, and 56c. Residual current windings 30, 37, and 37' are energized from autotransformer 61 which has an adjustable tap 62 in order to adjust for the constant K in Equation 8 above, thereby providing means for adjusting for the residual current compensation in accordance with the particular constants of the system being protected.

The windings 29, 36, and 36' of electroresponsive device 16 are arranged to be energized with the current IA, IB, or Ic, depending on which of the conductors 12A, 12B, or 12c is faulty. The energization circuit for these windings is completed through closure of one of the normally open contacts 58A, 58B, or 58c of the respective current transfer relays 56A, 56B, or 56c. Because of the make-before-break arrangement in either direction of current transfer relays 56A, 56B, and 56c, no undesirable arcing will occur at the contacts 58 and 59 of these current transfer relays even though high currents flow therethrough.

As was mentioned above, a distance relay of the reactance type energized in accordance with the expression of Equation 8 may give false operation on double line-to-ground faults due to the fact that the current flowing between the faulted phases may reduce the angle $\phi$ so that the reactance measured is falsely small. My ground-fault protective scheme is designed to give complete protection on isolated phase systems where three-phase faults, line-to-line faults or double line-to-ground faults cannot occur. On other systems, an additional protective means will be provided to protect against faults not involving ground as well as double line-to-ground faults. When a double line-to-ground fault occurs on my protective system, two phase selector relays 52 will drop out and cause two of the current transfer relays 56 to be energized so that the windings 29, 36, and 36' receive the sum of the currents in the two faulted phases which is equal to the residual current when no current flows in the third conductor. Assuming that the phase-sequence rotation of the system is the conventional positive-phase-sequence rotation, this residual current operating in conjunction with the more leading of the two faulted line-to-neutral potentials in the ohm unit OU gives a reactance measurement larger than the correct one while this residual current operating in conjunction with the more lagging of the faulted line-to-neutral potentials causes the ohm unit to operate with a reactance measurement less than the correct one. This is due to the fact that the residual current is substantially in phase with the more lagging of the two faulted line-to-neutral potentials. Accordingly, to prevent false operation on double line-to-ground faults, I have arranged my protective system so that, in the event of a double line-to-ground fault, the more leading of the two faulted line-to-neutral potentials is applied to the electroresponsive device 16. This is accomplished by the serial arrangement of the contacts 54 and 55 of selector relays 52A and 52C as was described above. In this way, correct operation will be obtained on some double line-to-ground faults and delayed operation on the remainder so that good back-up protection will be provided for the protective relays not shown to protect against phase faults or faults not involving ground which protective system would normally be expected to clear double line-to-ground faults.

If an external fault were to change its character suddenly after electroresponsive device 16 has started to operate in delayed time, it might be energized with the wrong current and potential for the new fault condition and, accordingly, might trip falsely as though the fault were in the protected section. To prevent this, I provide a trip-delay relay 63 which is connected in series with the contacts 20 of the starting unit SU and the contacts 24 of the ohm unit OU. Trip-delay relay 63 is preferably supplied with a short time-delay pickup so as to prevent its contacts 64 from being closed with consequent energization of the trip circuit including trip coil 13 until after a sufficient delay has occurred to prevent false operation of electroresponsive device 16. For example, if a remote or external line-to-ground fault blew into the phase conductor carrying a current or potential leading the corresponding current or potential of the faulted conductor by 120 degrees, the potential with which electroresponsive device 16 is energized for correct operation thereof should be the potential leading by 120 degrees. The selector relays 52 will, of course, immediately change the connections to the proper ones but, for a fraction of a cycle, the distance relay comprising electroresponsive device 16 will be energized with the wrong potential and momentarily its tripping contacts may be closed. I have found that, if trip-delay relay 63 is adjusted so that the contacts of the distance relay comprising electroresponsive device 16 are required to be closed for one cycle before the contacts 64 of trip-delay relay 63 are closed, an ample margin for preventing false tripping is provided.

The closing of contacts 64 of trip-delay relay 63 completes the energization of seal-in relay 15 to close a plurality of contacts 65 whereupon trip coil 13 is energized and, if desired, a suitable alarm schematically shown at 66 may also be energized to indicate to the operator the tripping of circuit breaker 11.

The operation of the ground-fault protective scheme illustrated in the drawing will be understood by those skilled in the art in view of the detailed description included above. Whenever a single line-to-ground fault occurs on the protected section 12 of the polyphase circuit, one of the phase selector relays 52 is deenergized to cause the proper phase potential to be impressed on the potential windings of electroresponsive device 16. At the same time, this selector relay closes the energization circuit of a corresponding current transfer relay to cause the desired energization of the current windings of electroresponsive device 16. Closure of the contacts 29 of the starting unit SU will cause the timing unit TU to operate and, after a predetermined time, vary the ohmic response of ohm unit OU, through auxiliary relay AR and autotransformer 51. If both the starting unit SU and the ohm unit OU operate to close their respective contacts, tripping of circuit breaker 11 will result after a predetermined delay introduced by trip-delay relay 63, this delay being sufficient to allow the other protective relays, not shown, to operate and electroresponsive device 16 to reset in the event that the fault is of the type against which electroresponsive device 16 is not designed to protect. In the event of a double line-to-ground fault, two of the selector relays 52 will be energized and, because of the contact arrangement of contacts 54 and 55 of the selector relay, the potential windings of the ohm unit as well as the starting unit are energized with the more leading of the two faulted line-to-neutral potentials to prevent overreaching and, consequently, to provide back-up protection in the event of failure of the phase fault relays to clear the fault.

While I have shown and described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In a distance-responsive relay of the reactance type for protecting a polyphase alternating-current circuit against ground faults comprising an electroresponsive device having current and potential windings, means including a plurality of selector relays for controlling the energization of said potential windings from said circuit, a plurality of current transfer relays each operative in response to operation of a corresponding one of said selector relays for controlling the energization of said current windings from said circuit, and time-delay means for preventing false operation of said electroresponsive device in the event that one predetermined type of fault on said circuit changes to another predetermined type.

2. In a distance-responsive relay for protecting a polyphase alternating-current circuit against ground faults comprising a circuit interrupter controlling electroresponsive device having current and potential windings, means including a plurality of undervoltage relays each responsive to a different one of the line-to-neutral voltages of said alternating-current circuit for energizing the potential winding of said electroresponsive device with the line-to-neutral potential of the phase conductor of said polyphase circuit having a ground fault thereon, a plurality of current transfer relays, one for each phase of said alternating-current circuit each operative in response to the operation of a corresponding one of said selector relays for causing energization of said current winding in response to the line current flowing in said phase conductor having a ground fault thereon, and means for preventing effective operation of said electroresponsive device for a predetermined interval of time to prevent undesired operation of said circuit interrupter.

3. In a distance-responsive relay for protecting a polyphase alternating-current circuit against ground faults comprising a circuit interrupter controlling electroresponsive device having current and potential windings, means including a plurality of undervoltage relays each responsive to a different one of the line-to-neutral voltages of said alternating-current circuit for engaging the potential winding of said electroresponsive device with the line-to-neutral potential of the phase conductor of said polyphase circuit having a ground fault thereon, a plurality of current transfer relays, one for each phase of said alternating-current circuit each operative in response to the operation of a corresponding one of said selector relays for causing energization of said current winding in response to the line current flowing in said phase conductor having a ground fault thereon, and time-delay means energized in response to operation of said electroresponsive device for preventing said electroresponsive device from effectively controlling said circuit interrupter until after the expiration of a predetermined interval of time for preventing false effective operation of said electroresponsive device in the event that an external single line-to-ground fault changes to a double line-to-ground fault.

4. In a distance-responsive ground-fault protective system for a polyphase alternating-current circuit comprising an electroresponsive device having a potential winding, means for causing said potential winding to be energized with the line-to-neutral potential of the phase conductor of said polyphase circuit having a ground fault thereon when said fault involves only one phase conductor, and means for always selecting with reference to phase position a predetermined one of the line-to-neutral potentials of the faulted phase conductors of said polyphase circuit for energizing said potential winding to prevent overreaching of said electroresponsive device in the event of any ground fault on said circuit involving more than one phase conductor.

5. In a ground-fault protective system for a polyphase alternating-current circuit comprising a distance relay of the reactance type having a current and a potential winding, means for energizing said current winding in response to the line current flowing in the phase conductor of said polyphase circuit having a ground fault thereon, means for causing said potential winding to be energized with the line-to-neutral potential of the phase conductor of said polyphase circuit having a ground fault thereon, and means for selecting a predetermined one of the line-to-neutral potentials of the faulted phase conductors of said polyphase circuit for energizing said potential winding in the event that the ground fault on said system involves more than one phase conductor.

6. In a ground-fault protective system for a polyphase alternating-current circuit comprising an electroresponsive device having a potential winding, means for causing said potential winding to be energized with the line-to-neutral potential of the phase conductor of said polyphase circuit having a ground fault thereon, and means for selecting the more leading of the line-to-neutral potentials of the faulted phase conductors of said polyphase circuit for energizing said potential winding in the event of any ground fault on said system involving more than one phase conductor.

7. In a ground-fault protective system for a polyphase alternating-current circuit comprising a distance relay of the reactance type having a current and a potential winding, means for energizing said current winding in response to the line current flowing in the phase conductor of said polyphase circuit having a ground fault thereon, means for causing said potential winding to be energized with the line-to-neutral potential of the phase conductor of said polyphase circuit having a ground fault thereon, and means for selecting the line-to-neutral potential of the phase conductor of said alternating-current circuit having a ground fault thereon which is the more leading with respect to vector notation and for energizing said potential winding therefrom in the event of any ground fault on said system which involves more than one phase conductor.

8. In a ground-fault protective system for a polyphase alternating-current circuit comprising an electroresponsive device having a current winding and a potential winding, means for energizing said current winding from said alternating-current circuit, and means for causing said potential winding to be energized with the line-to-neutral potential of the phase conductor of said polyphase circuit having a ground fault thereon and for causing said potential winding to be energized with the more leading of the line-to-neutral potentials of the faulted conductors in the event of any ground fault on said polyphase circuit involving more than one phase conductor.

9. In a ground-fault protective system for a polyphase electric circuit comprising an electroresponsive device having a current and a potential winding, a plurality of selector relays one for each phase conductor of said circuit connected to said circuit and operative to energize said potential winding with the line-to-neutral potential of the faulted phase conductor of said circuit, and means for energizing said potential winding with a predetermined one of said faulted line-to-neutral potentials in the event that the ground fault on said system involves more than one conductor.

10. In combination, a polyphase alternating-current circuit, circuit-interrupting means for controlling said circuit, a distance-responsive electroresponsive device for controlling said circuit-interrupting means to protect said circuit against ground faults thereon, said electroresponsive device having a current and a potential winding, means including a plurality of selector relays for controlling the energization of said potential winding from said circuit, a plurality of current transfer relays each operative in response to operation of a corresponding one of said selector relays for controlling the energization of said current winding from said circuit, and time-delay means for preventing operation of said circuit-interrupting means until after a predetermined interval of time has elapsed after operation of said electroresponsive device.

11. In a ground-fault protective system for a polyphase electric circuit comprising an electroresponsive device having a current and a potential winding, a plurality of selector relays one for each phase conductor of said circuit connected to said circuit and operative to energize said potential winding with the line-to-neutral potential of the faulted phase conductor of said circuit, and means for energizing said potential winding with the more leading of the line-to-neutral potentials of the faulted phase conductors in the event of any ground fault on said system involving more than one conductor.

12. In a ground-fault protective system for a polyphase electric circuit comprising an electroresponsive device including a power directional relay, a plurality of windings on said relay including a restraining winding, an operating winding, and a polarizing winding, means for energizing said restraining winding with the line-to-neutral potential of said circuit, means for energizing said operating winding with the line plus a predetermined amount of residual current of said circuit, and means for energizing said polarizing winding with the residual potential of said circuit.

13. In a distance-responsive protective system for a polyphase alternating-current circuit comprising an electroresponsive device having a winding, means for causing said winding to be energized with a predetermined electrical quantity of said circuit depending upon the phase conductor of said circuit having a fault thereon when said fault involves only one phase conductor so that said electroresponsive device has the same reach regardless of which phase conductor is involved in the fault, and means for so energizing said winding from said circuit to prevent overreaching of said distance relay in the event that said fault on said circuit involves two phase conductors.

ALBERT R. van C. WARRINGTON.

Certificate of Correction

Patent No. 2,363,915. November 28, 1944.

ALBERT R. van C. WARRINGTON

It is hereby certified that errors appear in the printed specification of the above-numbered patent requiring correction as follows: Page 1, second column, line 10, after the syllable "clude" strike out "a"; page 3, second column, lines 38, 41, and 49, for the Greek letter "($\theta$)" read ($\phi$); page 4, first column, line 51, for "a²" read $a_2$; page 7, first column, line 34, claim 3, for "engaging" read *energizing*; and that the said Letters Patent should be read with these corrections therein that the same may conform to the record of the case in the Patent Office.

Signed and sealed this 6th day of March, A. D. 1945.

[SEAL]

LESLIE FRAZER,
*Acting Commissioner of Patents.*